United States Patent [19]

Johnson, Jr.

[11] Patent Number: 4,785,842

[45] Date of Patent: Nov. 22, 1988

[54] RESETTABLE VIBRATION-ACTUATED EMERGENCY SHUTOFF MECHANISM

[76] Inventor: Ayres W. Johnson, Jr., 22560 Jefferson Point Rd. NE., Kingston, Wash. 98346

[21] Appl. No.: 83,745

[22] Filed: Aug. 7, 1987

[51] Int. Cl.⁴ ............................................. F16K 17/36
[52] U.S. Cl. ........................................ 137/38; 251/65
[58] Field of Search .............................. 137/38; 251/65

[56] References Cited

U.S. PATENT DOCUMENTS

| | | |
|---|---|---|
| 2,927,592 | 3/1960 | Ferre, Sr. ............................. 137/38 |
| 3,360,007 | 2/1967 | Haidek et al. ...................... 137/528 |
| 3,783,887 | 1/1974 | Shoji ..................................... 137/38 |
| 4,116,209 | 9/1978 | Greer ................................... 137/38 |
| 4,207,912 | 6/1980 | Ichikawa ............................. 137/39 |
| 4,640,303 | 2/1987 | Greenberg ........................... 137/38 |

FOREIGN PATENT DOCUMENTS 12172  1/1982  Japan ..................................... 137/38

Primary Examiner—Robert G. Nilson
Attorney, Agent, or Firm—Robert W. Beach; Ward Brown

[57] ABSTRACT

A valve movable elevationally in a valve casing between a lower closed position and an elevated open position is or carries a magnetizable component of magnetic means. Upward movement of the valve is limited by engagement with an annular stop flange projecting downward from the upper portion of the casing. A permanent magnet component of the magnetic means is received inwardly of the annular stop flange and is movable upward by cooperating screw threads to separate the magnet component from the armature carried by the valve after the valve has been raised from closed position into engagement with the stop flange by elevational movement of the permanent magnet component relative to the valve casing.

5 Claims, 4 Drawing Sheets

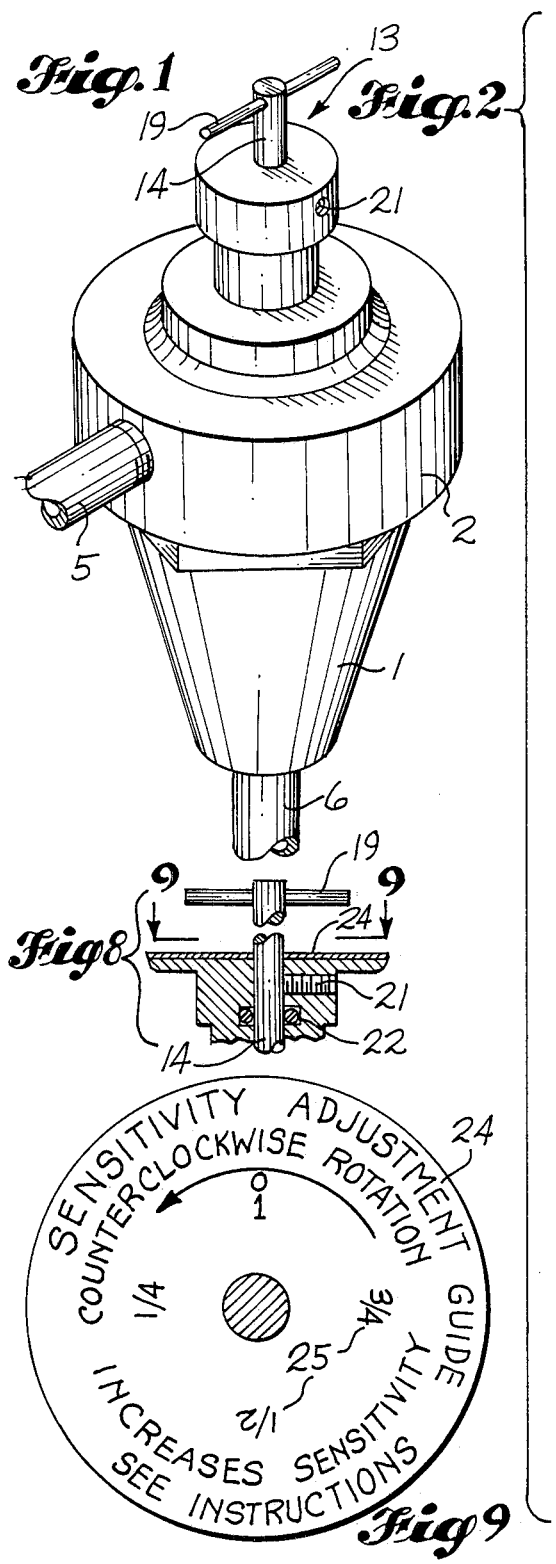

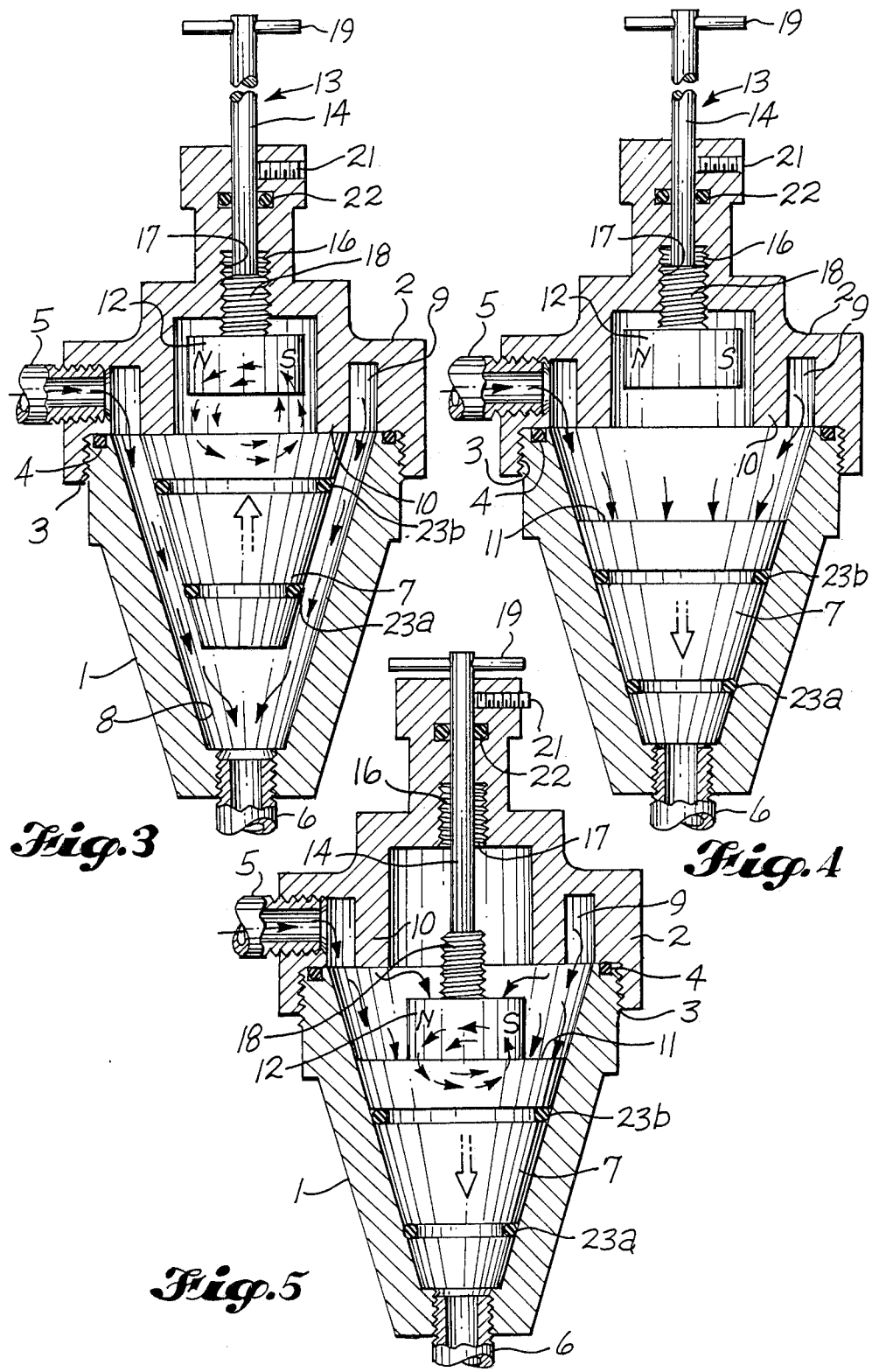

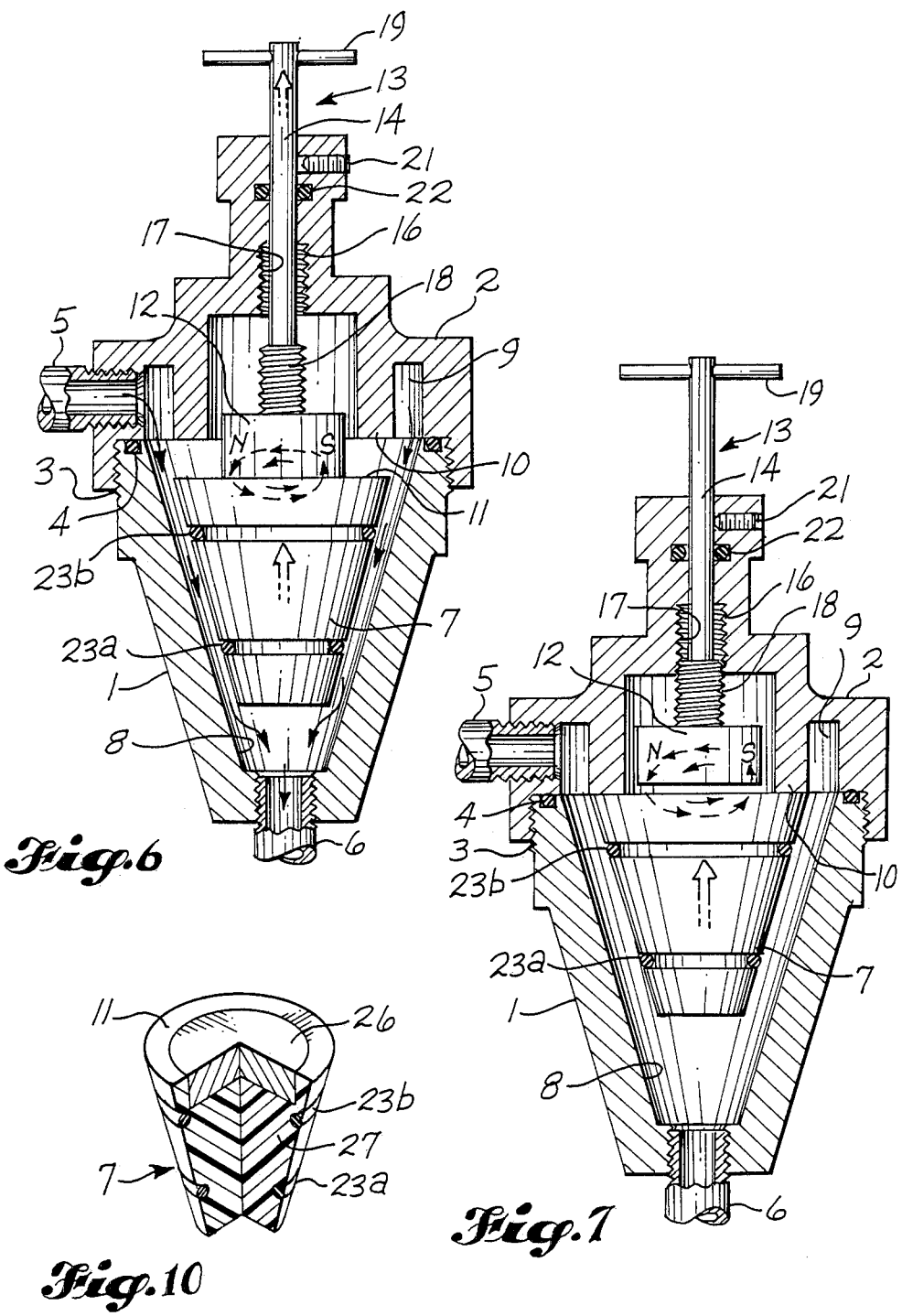

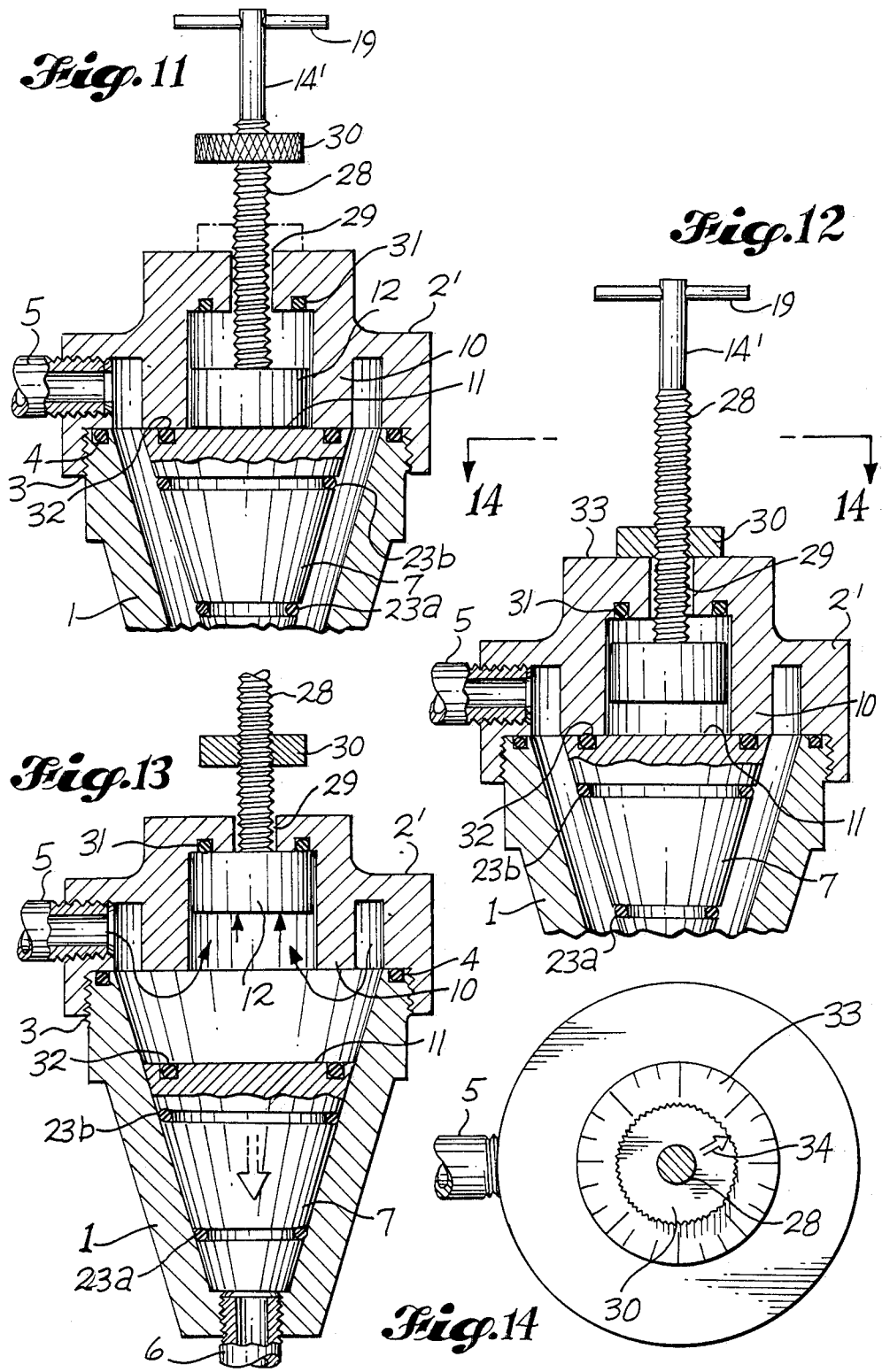

RESETTABLE VIBRATION-ACTUATED EMERGENCY SHUTOFF MECHANISM

BACKGROUND OF THE INVENTION

1. Field of the Invention

This invention relates to shutoff mechanism operated automatically in case of an emergency which produces excessive vibration or shaking, such as caused by an earthquake.

2. Problem

Violent shaking, such as produced by an earthquake, explosion concussion or impact jar, can disrupt pipelines, such as for gas, gasoline, oil, acid, caustic liquid or water, or even electric lines. A spark from a broken electric line could ignite gas escaping from a broken gas line, for example, to augment the damage that might be caused by the shock of an earthquake itself. Under such circumstances it is desirable to shut off the flow of gas, gasoline or oil from a broken pipeline to prevent fire, acid or caustic fluid from a broken pipeline to prevent damage and even the escape of water from a broken pipeline to prevent flooding.

Emergency shutoff mechanism has been proposed in the past to shut valves in fluid lines automatically in response to excessive vibration, such as caused by an earthquake, but such prior devices have had disadvantages or lacked advantages of the apparatus of the present invention.

3. Prior Art

U.S. Pat. No. 4,207,912, issued June 17, 1980, shows an emergency shutoff valve intended to shut off the supply of gas in the event of an earthquake of predetermined magnitude. The mechanism of this patent, however, does not provide for adjustment to enable operation of the mechanism to be effected upon being subjected to different degrees of vibration or shock.

U.S. Pat. No. 4,116,209, issued Sept. 26, 1978, discloses a shock-actuated shutoff valve, but this mechanism does not utilize a permanent magnet, and it would probably be difficult to reset the mechanism after an emergency shutoff actuation.

U.S. Pat. No. 3,783,887, issued Jan. 8, 1974, also discloses valve mechanism for gas and oil pipelines that would be shut off automatically by a predetermined degree of vibration, such as produced by an earthquake, but this mechanism does not provide an arrangement for altering the sensitivity of the mechanism to different degrees of vibration, and no provision appears to be made for resetting the valve to its upper position after it has dropped to closed position.

U.S. Pat. No. 3,360,007, issued Dec. 26, 1967, shows a mounting for a permanent magnet that is elevationally adjustable, but such adjustable magnet-supporting mechanism is not used in a vibration-actuated emergency shutoff mechanism.

U.S. Pat. No. 2,927,592, issued Mar. 8, 1960, discloses a shock or vibration emergency shutoff valve mechanism, but such mechanism does not utilize a magnet, and it is necessary to provide an additional control valve of some type in order to reset the valve necessary to remove an access door on the valve casing in order to gain access to the valve for resetting it, which would enable gas to escape from the casing.

SUMMARY OF THE INVENTION

A principal object of the present invention is to provide vibration-actuated emergency shutoff mechanism which is reliable in operation although the structure required for accomplishing such operation is simple.

A further object is to provide mechanism for varying the sensitivity of the shutoff mechanism so that it can be set to operate at different selected degrees of severity of vibration.

It is also an object to provide shutoff mechanism including a valve automatically movable to closed position by predetermined vibration, which can be reset easily to open position without requiring direct access to the valve.

The foregoing objects can be accomplished by utilizing a floating plug valve, normally retained in an elevated position by attraction of a permanent magnet, which will be closed by gravity upon being subjected to vibration greater than a predetermined intensity, and which magnet can be adjusted in position to alter the degree of intensity of vibration which will dislodge the valve from being supported by the magnetic field of the permanent magnet.

BRIEF DESCRIPTION OF THE DRAWINGS

FIG. 1 is a top perspective of the shutoff mechanism with parts in assembled relationship, and FIG. 2 is a top perspective of such shutoff mechanism with parts in exploded relationship, parts being broken away.

FIG. 3 is a vertical section through the shutoff mechanism showing the shutoff valve in open position, FIG. 4 is a similar view showing the valve in closed position, FIG. 5 is a similar view showing the valve-supporting mechanism ready to retrieve the valve from closed position, FIG. 6 is a similar view showing the valve in the process of being retrieved, and FIG. 7 is a similar view showing the valve in its retrieved position with the valve-supporting mechanism being reset to a predetermined sensitivity.

FIG. 8 is a detailed fragmentary section through a portion of the shutoff mechanism showing a modification, and FIG. 9 is a section taken on line 9—9 of FIG. 8.

FIG. 10 is a top perspective of a valve component of the shutoff mechanism with parts broken away, showing a different type of valve construction.

FIG. 11 is a vertical section through a modified type of shutoff valve mechanism with the valve in open position, FIG. 12 is a similar view of such modified shutoff valve mechanism with parts in a different position, and FIG. 13 is a similar view with the valve in closed position.

FIG. 14 is a plan of the modified shutoff valve mechanism shown in FIGS. 11, 12 and 13 with parts broken away.

DETAILED DESCRIPTION

While the principles of the present invention could be used in connection with vibration-actuated emergency shutoff mechanism to shut off different types of items such as gas pipes, gasoline pipes, water pipes and electric circuits, the embodiments of the invention are illustrated with respect to shutoff valve mechanism intended especially for gas pipes.

The shutoff mechanism body or casing of circular cross section includes a lower portion or base 1 having a threaded open upper end closable by a casing cap 2 having internal threads 3 on its skirt matching the external threads on the upper end of the valve casing base. The joint between the upper end of the valve casing base 1 and the cap is sealed by an O ring 4 received in a groove in the upper end of the valve casing base and engageable by a shoulder at the root of the internal cap threads 3. Gas is supplied to the casing cap 2 by an inlet pipe connected to an opening in the skirt of the cap above its threads 3. An outlet pipe 6 is connected to an opening in the bottom of the casing base 1 lower than the inlet opening.

A floating frustoconical plug valve 7 is receivable in the cavity in the casing base 1, the internal wall 8 of which is tapered downwardly complemental to the peripheral wall of the valve 7, as seen best in FIGS. 3 to 7, inclusive.

When the casing cap 2 is screwed onto the upper end of the valve casing base 1, gas has access from the inlet pipe 5 to the casing base cavity through a downwardly opening annular groove 9 between the skirt of the cap and a downwardly projecting inner axial flange 10 spaced inward from the skirt of the cap. As shown in FIG. 3, the top surface 11 of valve 7 is engageable with the lower edge of such flange to limit the upward movement of the valve away from the outlet pipe 6.

The valve 7 is lifted and supported by a magnetic field created by cooperation of components of a magnetic means combination including a permanent magnet and a magnetizable armature. Such components include a permanent magnet 12 carried by magnet-supporting mechanism designated generally 13 and the armature may be formed by the valve 7 being of magnetizable material such as soft iron. The magnet-supporting mechanism includes a stem 14 slidable snugly through a vertical bore 15 in the upper portion or bonnet of cap 2. The lower end of such bore communicates with an enlarged downwardly-opening cavity 16 having internal threads 17 threadedly engageable by external threads 18 on an enlarged portion of stem 14 adjacent to magnet 12. The magnet-supporting mechanism can be reciprocated and rotated by a cross-pin handle 19 extending through a transverse bore 20 in the upper end portion of stem 14.

The unthreaded portion of stem 14 is slidable nonrotatively upward through the bore 15 in cap 2 by pulling on handle 19 to raise the magnet 12 from the position shown in FIG. 5 through the position shown in FIG. 6 almost to the position shown in FIG. 7. Preferably, the external thread 18 on the enlarged portion of stem 14 and the internal thread 17 in recess 16 of the cap bonnet are located and proportioned so that the thread 18 will engage the thread 17 just before the upper end 11 of valve 7 engages the lower edge of flange 10, as shown in FIG. 7. At this point, nonrotative upward movement of the magnet stem will be interrupted, and it will be necessary to turn the magnet stem by manipulation of the handle 19 in order to draw the threaded portion 18 of the magnet stem upward into the threaded portion of the cavity 16.

Since the valve 7 cannot move upward farther than shown in FIG. 7 because of its engagement with the edge of flange 10, rotation of the magnet stem to draw the threaded portion 18 of the stem into the threaded cavity 16 of the cap bonnet will withdraw the magnet 12 upward away from the upper end 11 of valve 7 serving as an armature. Such separation of the magnet from its armature will progressively reduce the amount of supporting force which the field of magnet 12 exerts on valve 7. Consequently, the farther magnet 12 is separated from valve 7, the smaller will be the degree of vibration of the shutoff mechanism required to dislodge valve 7 from the position shown in FIG. 3 to be dropped by the force of gravity into the closed position shown in FIG. 4.

When the valve is in the raised position shown in FIG. 3, there is an unobstructed passage for flow of gas from the inlet pipe 5 to the outlet pipe 6 by way of the downwardly-opening groove 9 in the cap 2 and the annular space between the valve 7 in its upper position and the wall 8 of the valve casing cavity as shown in FIG. 3. When the valve has thus dropped to closed position, the pressure of the gas entering the valve body through the inlet pipe 5 will exert pressure on the upper end 11 of the valve to maintain it closed, as indicated by the arrows in FIGS. 4 and 5.

The severity of vibration required to release the valve 7 from the magnetic field produced by the permanent magnet 12 so that it will close depends on the proximity of such magnet to the upper end 11 of the valve. If the magnet 12 is set close to the upper end 11 of valve 7 as shown in FIG. 7, a severe vibration will be required to dislodge the valve 7 from the magnetic field of the magnet 12 so that it will fall from the open position shown in FIG. 7 to the closed position shown in FIG. 4. If, however, the magnet 12 has been elevated a considerably greater distance from the upper end 11 of the valve as shown in FIG. 3, the valve will be dislodged from open position to closed position by a much weaker vibration. The farther the magnet is from the valve, the more sensitive it will be so that less violent vibrations will release the valve to close.

After setting the shutoff mechanism to the desired sensitivity, the magnet 12 can be fixed at the desired elevation by tightening a setscrew 21 in the valve cap bonnet against the stem 14.

The valve body is sealed against discharge of gas entering the valve body cavity through the inlet pipe 5 by an O ring seal 22 in the valve cap bonnet closely encircling the magnet stem 14. When the valve 7 is in the closed position shown in FIGS. 4 and 5, escape of gas past the valve to the outlet 6 is blocked by O ring seals 23a and 23b encircling the valve and bearing on the valve casing cavity wall 8, as shown in FIGS. 4 and 5.

The elevation of the magnet 12 in the cavity of cap 2 can be indicated by a dial 24 shown in FIGS. 8 and 9 carried by the bonnet of the cap 2. Such dial may bear graduations 25 indicating the degree of rotation of the valve handle 19 effecting relative rotation of the threads 17 and 18. The pitch of the threads determines the amount of elevational adjustment of magnet 12 effected by turning handle 19 a given amount.

The valve 7 can be retrieved from the lower closed position shown in FIG. 4 by manipulation of the magnet-supporting mechanism without requiring access to the interior of the valve casing. For this purpose, the handle 19 is turned in the direction to lower thread 18 relative to thread 17 until the threads become disengaged, as indicated in FIG. 5. The valve stem 14 can then be slid downward through the bore 15 until the magnet 12 rests on the upper end 11 of the valve. The handle 19 can then be pulled upward to raise the magnet 12 for lifting the valve from the position shown in FIG. 5 through the position shown in FIG. 6 to the position shown in FIG. 7. In order to separate the magnet 12 from the upper end 11 of the valve, it is necessary for the stem handle 19 to be turned to engage the upper end of lid 18 with the lower end of thread 17. Rotation of the stem by the handle 19 can be continued until the valve 12 has been elevated from the upper end of the stopped valve 7 as far as desired to establish the preferred sensitivity of the valve.

It may be difficult to determine exactly when the upper end 11 of valve 7 engages the lower edge of internal flange 10 because, as has been stated above, it is preferred that thread 18 engage thread 17 before the valve end 11 reaches the edge of flange 10 so that it is not necessary to pull the magnet off the valve by application of direct upward force to the stem 14 as distinguished from the wedging action accomplished by interengagement of threads 18 and 17 to separate the magnet and the valve gently.

In the shutoff mechanism shown in FIGS. 1 to 7 inclusive, the valve 7 constitutes the armature. It is not necessary, however, that the entire valve be made of magnetizable metal. FIG. 10 shows an alternative type of valve in which a magnetizable inset plug 26, such as of soft iron to form an armature, is embedded in the upper end 11 of the valve body 7 while the remainder 27 of the valve body is made of plastic material. Alternatively the valve body 7 or the plug 26 could be the permanent magnet component of the magnet means combination and the member 12 could be the armature. Such a valve as shown in FIG. 10 or the reversed component magnet means will operate in the same manner as the valve described in connection with FIGS. 1 to 9.

With the modified emergency shutoff mechanism structure shown in FIGS. 11 to 14, it is much easier to discern when the upper end 11 of valve 7 engages the lower edge of internal flange 10. In this type of construction the magnet stem 14' has an enlarged externally threaded portion 28 that is much longer than the threaded portion 18 of the stem 14 shown in FIGS. 2 to 7. In this construction, the threaded portion 28 of the stem will slide freely through a bore 29 in the bonnet of cap 2'. Consequently, after the magnet 12 has been lowered into contact with the upper end 11 of valve 7 in the position shown in FIG. 5, the stem can be pulled upward with its threaded portion 28 sliding through the bore 29 until resistance to such pulling occurs by the upper end 11 of valve 7 encountering the lower edge of internal flange 10 in the position shown in FIG. 11 With the valve stem 14' held in this position by the handle 19, a knurled circular nut 30 threaded onto the thread 28 can be turned down until it engages the top of the bonnet of cap 2' in the broken line position shown in FIG. 11. While the nut 30 is held against rotation, stem 14' can then be rotated by handle 19 to draw the magnet upward away from the valve such as to the position shown in FIG. 12 in which the desired sensitivity of the valve-supporting mechanism will have been established.

When the valve 7 is in its lower closed position, as shown in FIG. 13, the pressure of gas in the casing 1 resulting from gas supplied through the inlet pipe 5 will act on the exposed lower surface of magnet 12 and raise it until its upper side contacts the sealing O ring 31 received in an annular groove in the bonnet of valve 2' Such seal prevents the escape of gas past magnet 12 through the bore 29 in the bonnet of the valve cap.

When the valve 7 is in the open position shown in FIGS. 11 and 12, escape of gas past the valve to exert pressure on the magnet 12 will be prevented by an O ring seal 32 between the upper end 11 of the valve 7 and the lower edge of internal flange 10. Such O ring is received in a groove in the upper end of the valve.

The elevation of magnet 12 relative to the upper end 11 of valve 7 can be indicated by the rotative position of nut 30 relative to a dial 33 on the upper end of the bonnet. The nut 30 may have an index 34 cooperating with the graduations of dial 33 marked appropriately. The graduations 33 will indicate the proportion of a single turn and, when the nut 30 is in the broken line position shown in FIG. 11, the number of full turns that it is rotated with respect to the valve casing cap can be counted with the proportion of the final turn being indicated by the position of the index 34 relative to the scale 33.

I claim:

1. In vibration-actuated emergency shutoff mechanism, a casing, a shutoff member received in the casing and movable elevationally between a lower shutoff position and an elevated position, the improvement comprising supporting means for the shutoff member including magnetic means having a magnet component and a magnetizable armature component which cooperate for holding the shutoff member in its elevated position by a magnetic force acting between said magnet component and said armature component, one of said magnetic means components being movable with the shutoff member means supporting the other component from the casing and including a stem extending downward through the upper portion of the casing for lowering the magnetic means component supported from the casing into cooperative relationship with the magnetic means component movable with the shutoff member when the shutoff member is in its lower shutoff position, and said stem being movable upward to move the shutoff member with the magnetic means component movable with the shutoff member from its lower shutoff position upward to an elevated position.

2. In the shutoff mechanism defined in claim 1, the stem and the casing having cooperative screw threads for moving the magnetic means component supported from the casing relative to the magnetic means component movable with the shutoff member.

3. In the shutoff mechanism defined in claim 2, and cooperating dial and index means for indicating the elevation of the magnetic means component supported from the casing relative to the casing.

4. In the shutoff mechanism defined in claim 1, stop means independent of said magnetic means for limiting upward movement of the shutoff member, the stem and the casing having cooperating screw threads for moving the magnetic means component supported from the casing upward away from the magnetic means component movable with the shutoff member after upward movement of the shutoff member has been stopped by its engagement with said stop means.

5. In a vibration-actuated emergency shutoff valve mechanism, a valve casing having a valve-receiving cavity therein, an inlet opening in the valve casing for supply of fluid thereto, an outlet opening in the valve casing below the inlet opening for discharge of fluid from the valve casing, and a valve received in the valve casing and movable elevationally between a lower closed position in which flow from the valve casing through the outlet opening is blocked and an elevated open position, the improvement comprising valve-supporting means including magnetic means having a magnet component and a magnetizable armature component which cooperate for holding the valve in its elevated open position by a magnetic force acting between said magnet component and said armature component, one of said magnetic means components being movable with the valve and the other component being supported from the valve casing, and stop means independent of said magnetic means for limiting upward movement of the valve in the valve casing and including an internal annular flange projecting downward from the upper portion of the casing into the valve-receiving cavity and encircling the magnetic means component supported from the valve casing.

* * * * *

UNITED STATES PATENT AND TRADEMARK OFFICE
CERTIFICATE OF CORRECTION

PATENT NO. : 4,785,842
DATED : November 22, 1988
INVENTOR(S) : Ayres W. Johnson, Jr.

It is certified that error appears in the above-identified patent and that said Letters Patent is hereby corrected as shown below:

Claim 1: column 6, line 23, insert a comma after "member".

Signed and Sealed this

Twenty-third Day of May, 1989

Attest:

DONALD J. QUIGG

Attesting Officer

Commissioner of Patents and Trademarks